April 30, 1946.　　　　W. H. SILVER　　　　2,399,396

WHEEL MOUNTING MEANS

Original Filed May 5, 1941

*INVENTOR.*
WALTER H. SILVER

ATTORNEYS

Patented Apr. 30, 1946

2,399,396

UNITED STATES PATENT OFFICE 2,399,396

WHEEL MOUNTING MEANS

Walter H. Silver, Moline, Ill., assignor to Deere & Company, Moline, Ill., a corporation of Illinois Original application May 5, 1941, Serial No. 391,918, now Patent No. 2,346,514, dated April 11, 1944. Divided and this application May 3, 1943, Serial No. 485,551

10 Claims. (Cl. 301—9)

This application is a division of my co-pending United States application, Serial No. 391,918, filed May 5, 1941, now United States Letters Patent 2,346,514, dated April 11, 1944.

The present invention relates generally to self-interrupting clutch mechanisms for agricultural implements and the like and is particularly concerned with clutches of the half-revolution type arranged to raise and lower the tools or other parts of an agricultural implement.

The object and general nature of the present invention is the provision of a new and improved connecting or clamping means for securing a ground wheel to the driving member of the clutch. More particularly, it is a feature of this invention to provide wheel securing means which does not interfere with the assembly or disassembly of the clutch mechanism or the lubricant-tight sealing engagement between the controlling casing and the driving and driven parts of the clutch.

These and other objects and advantages of the present invention will be apparent to those skilled in the art after a consideration of the following detailed description, taken in conjunction with the accompanying drawing illustrating the preferred form of this invention.

Figure 1:
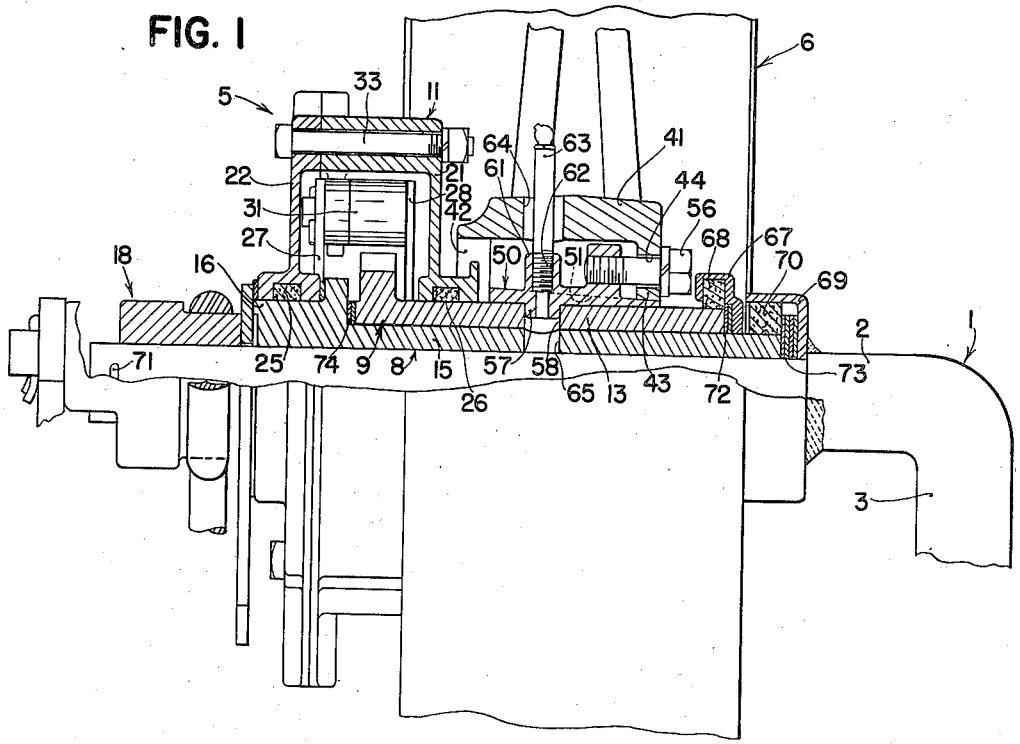
Figure 1 is a sectional view taken generally axially through the crank axle, landwheel and clutch mechanism of an agricultural implement constructed and arranged according to the principles of the present invention.

The present invention has been illustrated as incorporated in the land wheel axle construction of a disk tiller similar to that shown in the parent application identified above or similar to that shown in my prior United States Patent No. 2,192,333, issued March 5, 1940. The crank axle of such an implement is indicated by the reference numeral 1 and includes an axle section 2 and a crank section 3. Mounted on the axle section 2 is a half revolution clutch, indicated in its entirety by the reference numeral 5, and a ground wheel indicated in its entirety by the reference numeral 6, both being generally coaxially arranged. In general, the clutch 5 comprises driving and driven parts 8 and 9 which are adapted to be connected together by self-interrupting means which is under the control of a rockable casing 11 which serves the dual purpose of controlling the clutch and also enclosing and protecting all operating parts of the clutch from dust, dirt and the like. The casing also serves to retain lubricant whereby the parts are adequately lubricated at all times, irrespective of the conditions under which the machine is operated.

Referring now more particularly to Figure 1, the driving or active member of the clutch is indicated by the reference numeral 9, as mentioned above, and comprises a relatively long sleeve 13 disposed about the axle section 2 of the crank axle 1. The sleeve section 13 extends outwardly of the rockable casing 11 at one end, this end of the sleeve 13 receiving the land wheel 6 by means which will be described later. The inner end of the sleeve 9 is formed with a radial flange having outwardly facing external scallops or notches, and the driving member 9 of the clutch is journaled for rotation on a sleeve 15 which forms a part of the driven or inactive member 8 of the clutch. The sleeve 15 is supported for rotation on the axle section 2 of the crank axle 1 and extends outwardly of the casing 11 at the other side thereof, as indicated at 16. Through suitable lugs or the like, the member 8 is connected with a crank member 18 which is also mounted for rotation on the axle section 2 and is connected with the frame of the implement whereby, when the clutch is driven, the crank axle 1 is swung downwardly or upwardly relative to the frame for raising or lowering the latter. The casing 11 is formed of two parts 21 and 22, suitably bolted or fastened together at 33, and the central portions of the casing sections 21 and 22, being the portions through which the axle 2 and other parts extend, are provided with sealing means 25 and 26 cooperating with the clutch members 8 and 9. The present invention is not especially concerned with the particular details of the clutch 5, it being sufficient to note that there is a pair of strap members 27 and 28 which are connected at their outer ends (not shown) with the driven clutch member 9 and at their other ends carry a roller 31 which, in one position of the casing 11, is adapted to engage one of the notches on the flange of the member 9, whereby the clutch is engaged and the driving part drives the driven part. Movement of the casing 11 relative to the driven part causes the roller 31 to be moved into or out of a notch on the member 9.

Figure 2:
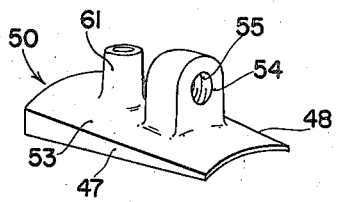
Figure 2 is a perspective view of one of the taper locks forming a part of the means for fixing the ground wheel to the driving part of the clutch mechanism.
Figure 4:
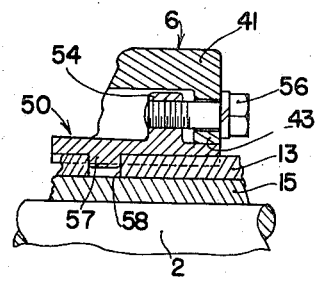
Figure 4 is a detail section of one of the wheel clamping blocks.
Figure 3:
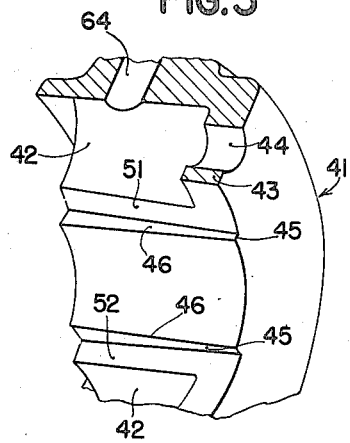
Figure 3 is a fragmentary perspective view of the hub of the ground wheel, showing the means by which the wheel is clamped in driving relation to the driving member of the clutch mechanism.
Figure 3:

As mentioned above, the land wheel 6 is arranged to be connected in driving relation with the driving member 9 of the clutch 5. The land wheel 6 includes a hub 41 which, as shown in Figure 3, is formed with a plurality of axially directed recesses 42 which are open at one end and at the other end terminate in a flange 43 which is apertured, as at 44. The radially inner edge of the flange or wall 43 is recessed, as at 45, to provide a pair of shoulders 46 which are adapted to engage opposite edges 47 and 48 of a tapered block member 50 (Figure 2). The wheel hub construction just described also provides ledges 51 and 52 which, as best shown in Figure 3, are tapered in an axial direction, corresponding in degree of taper to the exterior surface 53 (Figure 2) of the tapered block 50, upon which the ledges 51 and 52 are adapted to seat. Preferably, there are a plurality of tapered blocks 50 and each is provided with a lug 54 which is apertured, as at 55, and tapped to receive a clamping cap screw 56 (Figure 4) which is adapted to be inserted through the opening 44 of the wall 43. Also, each tapered block 50 is provided with a radially inwardly directed lug 57 (see Figure 4) which is adapted to be inserted into an opening 58 formed in the sleeve section 13 of the driving clutch member 9. The latter has as many openings as there are tapered blocks 50.

As best shown in Figure 1, to provide for lubrication one of the tapered blocks 50 has a radially outwardly extending lug 61 aligned with the inner lug 57, and these aligned lugs 57 and 61 are provided with a bore, the outer end of which is threaded, as at 62, to receive a lubricant fitting 63 inserted through an opening 64 which is formed in the hub 41 of the land wheel 6. The parts are so arranged that when the lifting crank 18 lines up with the lubricant fitting 63, an opening 65 formed in the sleeve section 15 of the driven clutch member 8 comes into alignment with the bored lugs 57 and 61, whereby lubricant passes through to the bearing of the driven clutch member 8 on the axle section 2, as best shown in Figure 1.

A dust cap 67 having sealing means 68 engaging the outer end of the driving clutch member 9 is disposed about the outer end of the sleeve section 15 of the driven clutch member 8. A second dust cap 69 is welded to the crank axle 1 and carries sealing means 70 sealing the outer end of the driven sleeve 8. The lifting crank 18 is held on the axle 1 by a cotter 71, and as best shown in Figure 1, this also holds the driving and driven clutch parts on the axle 1. Thrust rings or wearing washers 72 are disposed between the dust cap 67 and the laterally outer end of the sleeve section 13 of the driving clutch member 9, and similar wearing washers 73 are disposed between the outer end of the driven sleeve 15 and the cap 69. On the interior of the clutch, similar thrust washers 74 are disposed between the laterally inner end of the driving clutch member 9 and the flange section of the driven clutch member 8. Wear in the clutch may readily be taken up by removing the cotter 71 and slipping the clutch parts off the axle and inserting additional thrust washers.

It will be noted that, in effect, the casing 11 is split in a plane that is perpendicular to the axis of the axle and clutch parts and that these parts are assembled before the wheel 6 is applied. In applying the casing 11 about the parts the casing section 21 is applied over the ends of the sleeves 13 and 15, from the right side as viewed in Figure 1, and the other casing section 22 is applied over the end or hub 16 of the driven clutch member 8.

In order to accommodate this type of assembly readily, any clamping means by which the wheel 6 is to be secured in place must, therefore, not interfere with the assembly of the casing nor damage or destroy the sealing insert 26. It is for that purpose, therefore, that the openings 58 extend radially inwardly from the outer cylindrical surface of the hub 13, with no parts extending radially beyond the surface of the hub. In mounting the wheel onto the driving member 9 of the clutch, the tapered blocks 50 are first disposed in place with their lugs 57 extending into the openings 58. Next the hub 41 of the wheel 6 is disposed about the taper blocks, the flange 43 of the wheel hub engaging the thinner ends of the taper blocks 50. The cap screws 56 may then be inserted and, lastly, the wheel hub 41 drawn up onto the taper blocks, wedging the latter firmly into engagement with the sleeve 13 of the clutch without any danger of slippage or disconnection.

While I have shown and described above the preferred structure in which the principles of the present invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. The combination of a wheel having a hub provided with a plurality of inwardly facing recesses and a radially inwardly extending flange, a spindle adapted to receive said wheel, a plurality of tapered wedges adapted to be interlocked with said spindle, said wedges having portions adapted to be disposed in the recesses, respectively, of said wheel hub and adjacent said flange, and means acting between the flange and said portions for forcing the wheel hub onto said tapered wedges and holding the latter interlocked with said spindle.

2. The combination of a wheel having a hub provided with a plurality of inwardly facing recesses, a spindle adapted to receive said wheel, a plurality of tapered wedges adapted to be interlocked with said spindle, each wedge having a lug thereon, the lugs of said tapered wedges being adapted to be disposed in the recesses, respectively, of said wheel hub, and means acting between the latter and said lugs for forcing the wheel hub onto said tapered wedges and holding the latter interlocked with said spindle, said wheel hub having tapered shoulders adjacent said recesses adapted to bear against the edges of said tapered wedges.

3. The combination of a wheel having a hub provided with a plurality of inwardly facing recesses, a spindle adapted to receive said wheel, a plurality of tapered wedges adapted to be interlocked with said spindle, each wedge having a lug thereon, the lugs of said tapered wedges being adapted to be disposed in the recesses, respectively, of said wheel hub, and means acting between the latter and said lugs for forcing the wheel hub onto said tapered wedges and holding the latter interlocked with said spindle, said wheel hub having a flange forming one end of each of said inwardly facing recesses, said flange being apertured in alignment with each recess, and bolt means passing through the apertures in said flange and engaging the lugs on said tapered wedges for forcing the wheel hub onto said tapered wedges and holding them interlocked with said spindle.

4. The combination of a wheel having a hub provided with a plurality of inwardly facing recesses, a spindle adapted to receive said wheel, a plurality of tapered wedges adapted to be interlocked with said spindle, each wedge having a lug thereon, the lugs of said tapered wedges being adapted to be disposed in the recesses, respectively, of said wheel hub, and means acting between the latter and said lugs for forcing the wheel hub onto said tapered wedges and holding the latter interlocked with said spindle, said spindle having a plurality of apertures and said tapered wedges each having a lug adapted to be inserted in the associated aperture, said lugs and apertures forming the interlocking means between the tapered wedges and said spindle.

5. Means for attaching a wheel to a part to be connected therewith, said part being mounted for rotation on a support and having an interior recess extending therethrough to provide access to the bearing surfaces of said part and said support, said attaching means comprising a member adapted to be connected with said part in driving connection therewith, an inwardly directed hollow lug carried by said member and adapted to enter said recess, a lubricant fitting mounted on said lug, cooperating means on said wheel and said member whereby the latter is clamped in position on said part with said lug in said recess when said wheel is clamped to said member, and means forming an opening in the wheel adapted to be disposed in alignment with said lug so as to receive said lubricant fitting when the wheel is mounted in said position on said part with said lug in said recess.

6. In a wheel mounting, a support, a sleeve member mounted for rotation on said support and having a recess extending through said sleeve member into communication with the bearing surfaces on said sleeve member and said support, means for non-rotatably mounting said wheel on said sleeve member and including a part extending into and non-rotatably interlocked with said recess.

7. In a combination wheel and clutch mounting for agricultural implements and the like having a crank axle carrying said mounting, the latter comprising a driven sleeve mounted for rotation on said crank axle, a driving sleeve mounted for rotation on said driven sleeve, said sleeves having lubricant-receiving recesses adapted to register with one another so as to provide for directing lubricant to the bearing surfaces of said crank axle and said driven sleeve, the latter having a crank, wheel mounting means adapted to be mounted on said driving sleeve and including a mounting part having an apertured lug seating in the recess in said driving member, and a lubricant fitting carried by said apertured lug for directing lubricant into the recess in said driving member, said latter recess communicating with the contiguous bearing surfaces and said driving and driven sleeves, whereby lubricant may be directed to said latter surfaces in any position of said wheel and driving sleeve on said driven sleeve, the recess in said driven sleeve and said crank carried thereby being so related that when the crank is in a given position relative to said lubricant fitting, said recesses are in registration and lubricant may flow from said fitting through both of said recesses into the contiguous bearing surfaces on said crank axle and said driven sleeve, and means whereby said wheel is interlocked in driving relation with the member having said lug and whereby the latter is held with said lug in the recess in said driving sleeve.

8. The combination set forth in claim 7, further characterized by said driving sleeve having a plurality of recesses, there being a plurality of attaching members having lugs disposed, respectively, in the recesses in said driving sleeve, said wheel having a hub with an opening adapted to register with the apertured lug carrying said lubricant fitting whereby when said wheel is turned to carry the lubricant fitting into a given position relative to said crank, the recess in said driven sleeve comes into registration with the lug carrying said lubricant, whereby lubricant may be directed through both of said recesses into the bearing surfaces on said crank axle and said driven sleeve.

9. A coupling device for a rotatable wheel adapted to be mounted on a support and including a hub, said device comprising a spindle rotatable on said support, and having an opening therethrough, a part having a lug seating in said opening, means for fixing said wheel hub to said part in non-rotatable relation, said lug being hollow, and a lubricant fitting carried by said lug and adapted to supply lubricant through said hollow lug into the bearing surfaces on said spindle and support.

10. A coupling device for a rotatable wheel adapted to be mounted on a support and including a hub, said device comprising a spindle rotatable on said support, and having an opening therethrough, a part having a lug seating in said opening, means for interlocking said wheel hub with said part and the latter with said spindle, thereby fixing said wheel hub to said part and said part to said spindle, said lug having an opening therethrough communicating with said spindle opening, a lubricant fitting carried by said lug and adapted to supply lubricant through said communicating openings into the bearing surfaces on said spindle and support, and means forming an opening in the wheel adapted to be disposed in alignment with said lug so as to receive said lubricant fitting.

WALTER H. SILVER.